United States Patent [19]
Piper

[11] 3,777,877
[45] Dec. 11, 1973

[54] CONVEYOR ASSEMBLY
[75] Inventor: Robert J. Piper, Detroit, Mich.
[73] Assignee: Stearns Manufacturing Co. Inc., Flat Rock, Mich.
[22] Filed: Oct. 12, 1972
[21] Appl. No.: 296,748

[52] U.S. Cl. .............................................. 198/189
[51] Int. Cl. ........................................ B65g 17/06
[58] Field of Search ..................... 198/129, 181, 189

[56] References Cited
UNITED STATES PATENTS
3,718,249   2/1973   Hess .................................. 198/181

Primary Examiner—Edward A. Sroka
Attorney—Robert C. Hauke et al.

[57] ABSTRACT

A conveyor assembly for moving baggage through a claim area. The pallets of the conveyor are hexagon-shaped and are pivotally mounted to hinged support members in a manner which permits the conveyor to be banked to provide access to the baggage carried thereby and to be formed to provide both inside and outside curves to make maximum use of the available claim area.

10 Claims, 10 Drawing Figures

CONVEYOR ASSEMBLY

FIELD OF THE INVENTION

The present invention relates to conveyor assemblies and more particularly to such assemblies for use in airport terminals and the like to transport baggage to be loaded or through an area where it can be claimed by its owners.

BACKGROUND OF THE INVENTION

Conventional conveyor systems for displaying baggage and the like heretofore have commonly used sector-shaped pallets pivotally mounted to adjacent pallets to permit the conveyor to be moved around the necessary turns.

While such conveyors have been generally satisfactory, the pallets are not capable of being banked, that is moved from a horizontal position toward a vertical position, where the baggage carried by the conveyor is more visible and where the baggage is urged to the outermost edge of the conveyor where it can be more easily retrieved by its owners. Further, such conveyor assemblies do not have sufficient flexibility between adjacent pallets to permit the conveyor to be moved through sharp turns or through so-called "inside" turns. This imposes severe limitations on the use of such conveyor assemblies and prevents maximum use of premium space such as airport terminal space and the like.

SUMMARY OF THE PRESENT INVENTION

The present invention is directed to a conveyor assembly which utilizes hexagon-shaped pallets. Each pallet is pivotally mounted to a pair of support members so that each support member connects a pair of spaced adjacent pallets. The pivotal connection between the pallets, as well as the spacing therebetween, permits the pallets to pivot in scissor-like fashion as the support members are moved along a curved track. In addition, the support members are hinged along a centerline parallel to the plane of movement of the pallets to enable the assembly to accommodate the turns while still banked and to permit the assembly to be moved from a substantially horizontal position toward a vertical position. This then permits the conveyor pallets to be banked to provide better access to the baggage carried thereby.

DESCRIPTION OF THE DRAWINGS

A better understanding of the present invention can be had by referring to the following detailed description of a preferred embodiment of the invention. The description refers to the drawings in which like reference characters refer to like parts throughout the several views and in which.

DESCRIPTION OF THE PREFERRED EMBODIMENT

Figure 1:
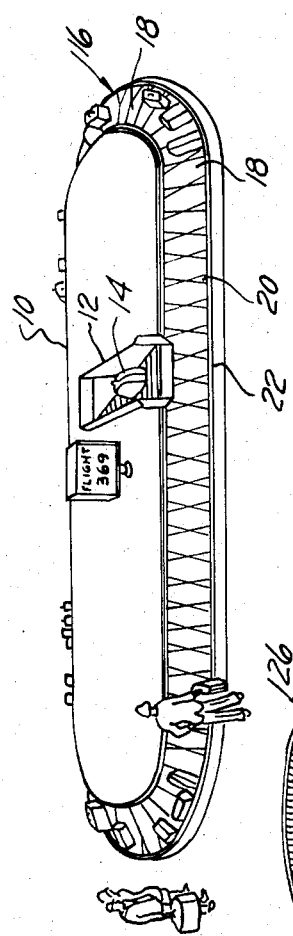
FIG. 1 is a perspective view of a baggage conveyor utilizing the assembly of the present invention.
Figure 2:
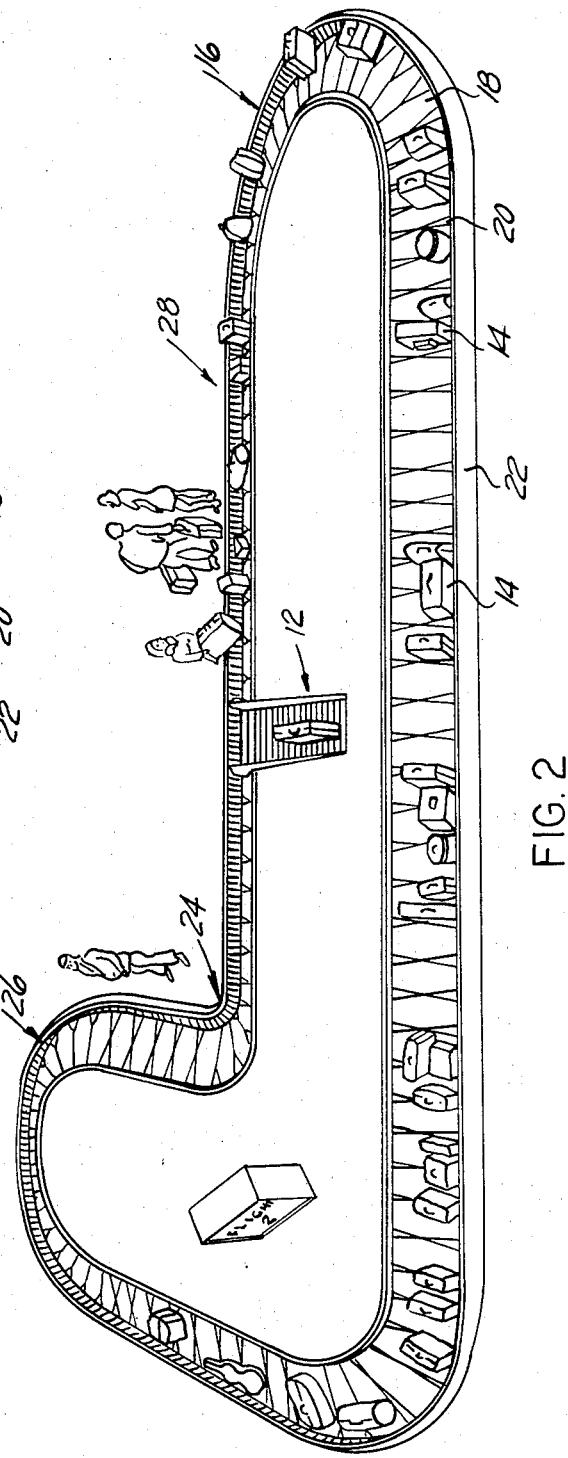
FIG. 2 is another perspective view illustrating a baggage conveyor utilizing the assembly of the present invention.

Now referring to FIGS. 1 and 2, conveyors are therein illustrated in use as a means for displaying baggage at airport terminals and the like.

The conveyor of FIG. 1 includes a central platform 10 having a ramp 12 for receiving baggage 14 and for depositing it on a closed-loop conveyor assembly 16. The assembly 16 includes pallets 18 and underlying support members 20. The pallets 18 are raised at the platform end so that the baggage 14 deposited on the assembly 16 slides downwardly against a guide rail 22. The conveyor of FIG. 1 is elliptical in shape.

FIG. 2 illustrates a conveyor similar to that of FIG. 1 but in which the layout includes an inside turn, indicated generally at 24, which permits the assembly to have a portion 26 which is at substantially a right angle to the main portion 28. Forming an inside turn, such as that shown at 24, is not possible with many conventional conveyor systems and permits maximum use of available space with the conveyor system of the present invention. The conveyor assembly 16 is also banked throughout its length, including the curves in the FIG. 2 configuration, and this too is difficult with many conveyor assemblies presently in use.

Figure 5:
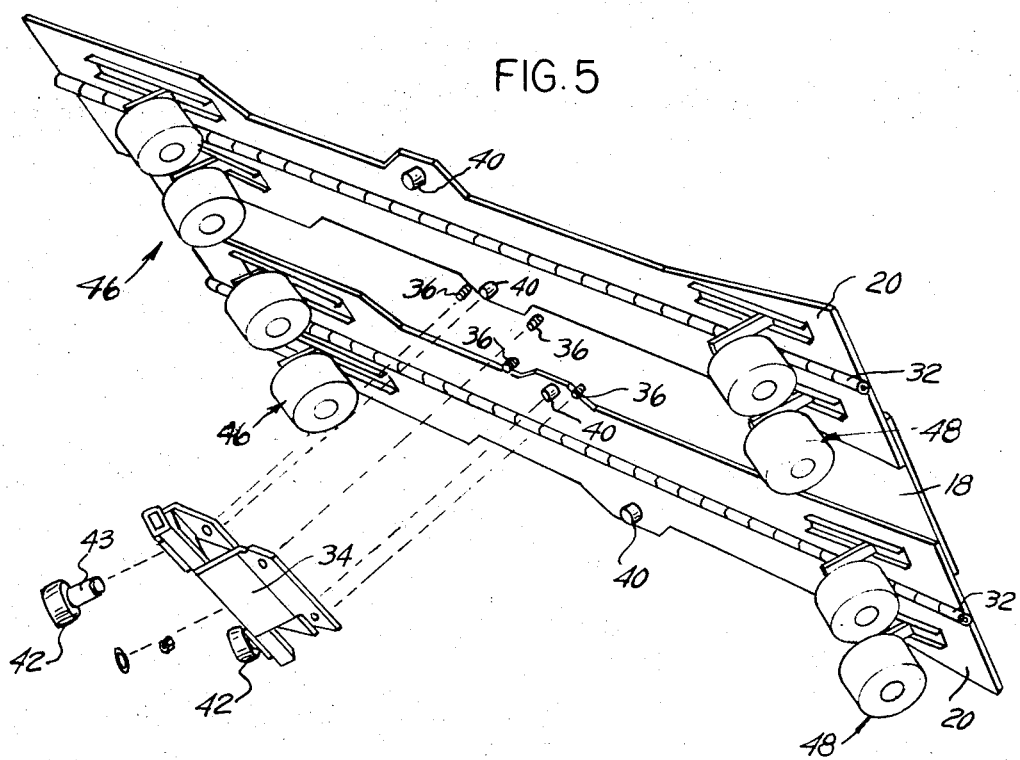
FIG. 5 is an exploded view of a portion of the conveyor assembly of the present invention with elements removed for purposes of clarity.
Figure 6:
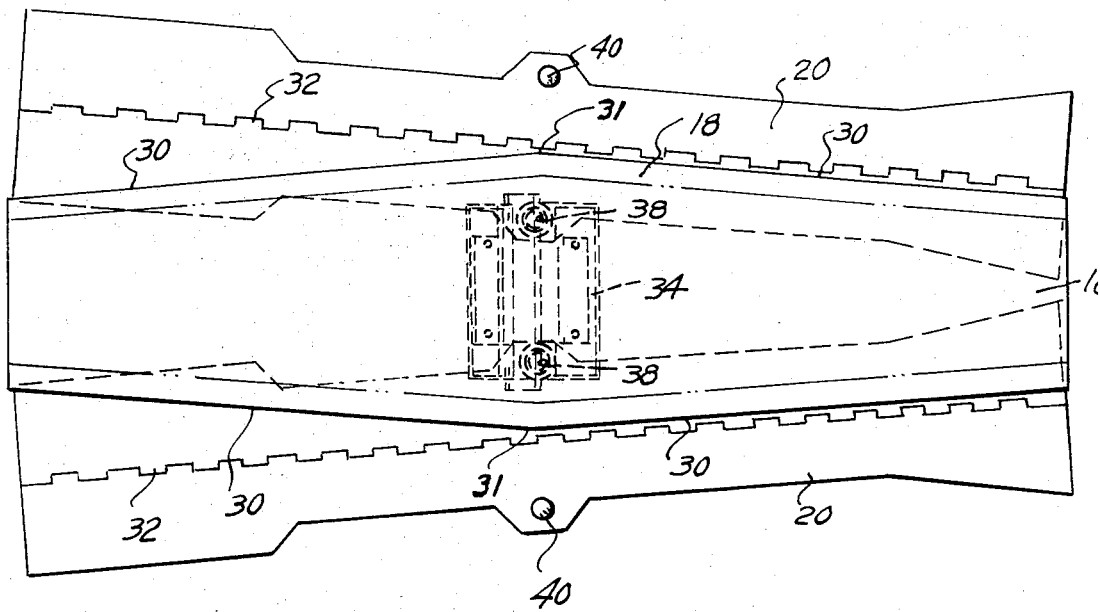
FIG. 6 is a top plan view of the assembly illustrated in FIG. 5.
Figure 7:
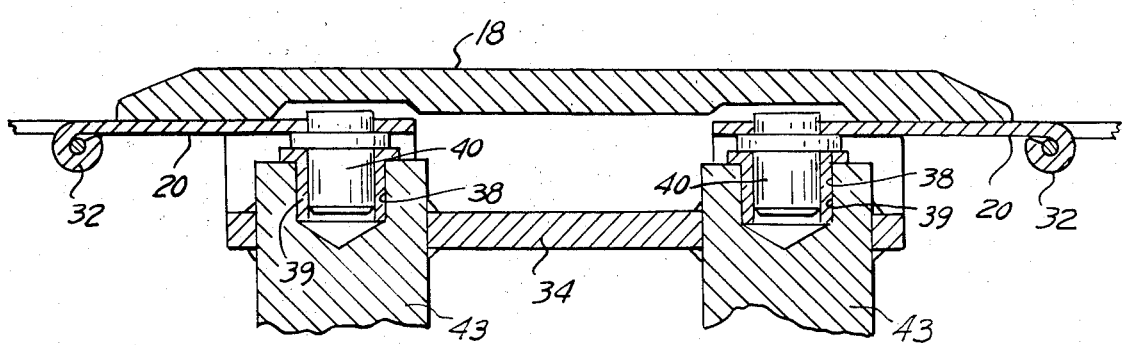
FIG. 7 is an enlarged view of a portion of the structure shown in FIG. 5.

FIGS. 5, 6 and 7 illustrate the construction of the pallets 18 and the support members 20 which permits the conveyor assembly 16 to be directed through inside and outside turns while maintained in a banked position. As best seen in FIG. 6, each of the pallets 18 is formed in an elongated hexagon shape with side edges 30 which extend toward each other from a point 31 of maximum width midway between the ends of the pallets 18.

The support members 20 are disposed intermediate and beneath adjacent pallets 18 and include a medial hinge 32 extending the length of the support members 20. A link plate 34 is mounted to the underside of the pallets 18 by fasteners 36 (FIG. 5). Each of the plates 34 is provided with a pair of spaced pivot pin recesses 38 (FIG. 7) in which are mounted bearings 39 and which are adapted to receive pivot pins 40 carried by the support members 20 to pivotally lock adjacent support members 20 together. Because the link plates 34 are fixed to the pallets 18 and are pivotally mounted to the support members 20, a pivotal connection between the pallets 18 and the support members 20 is provided. A pair of spaced rollers 42 are mounted to extensions 43 carried by the link plate 34. Each of the support members 20 also carries a pair of upper wheels 48 and a pair of lower wheels 46 (FIG. 5).

From the description to this point it is clear that the combination of the hinge 32 of the support members 20 and the pivotal connection between the support members 20 and the pallets 18, as afforded by the link plate 34, the pivot pins 40 and the recesses 38, permits the conveyor assembly 16 to be banked as shown in FIGS. 1 and 2 and to follow inside and outside turns as also illustrated in those drawings. As illustrated in FIG. 2, when the conveyor assembly 16 is moved through an inside turn as at 24 the pivotal connection between the pallets 18 and the support members 20 permits the lower side edges 30 of the pallets 18 to come together while the upper side edges 30 are spread apart to accommodate the inside turn 24. As best seen in FIG. 1, during a normal outside turn the upper side edges of the pallet come together and the lower side edges spread apart.

Figure 3:
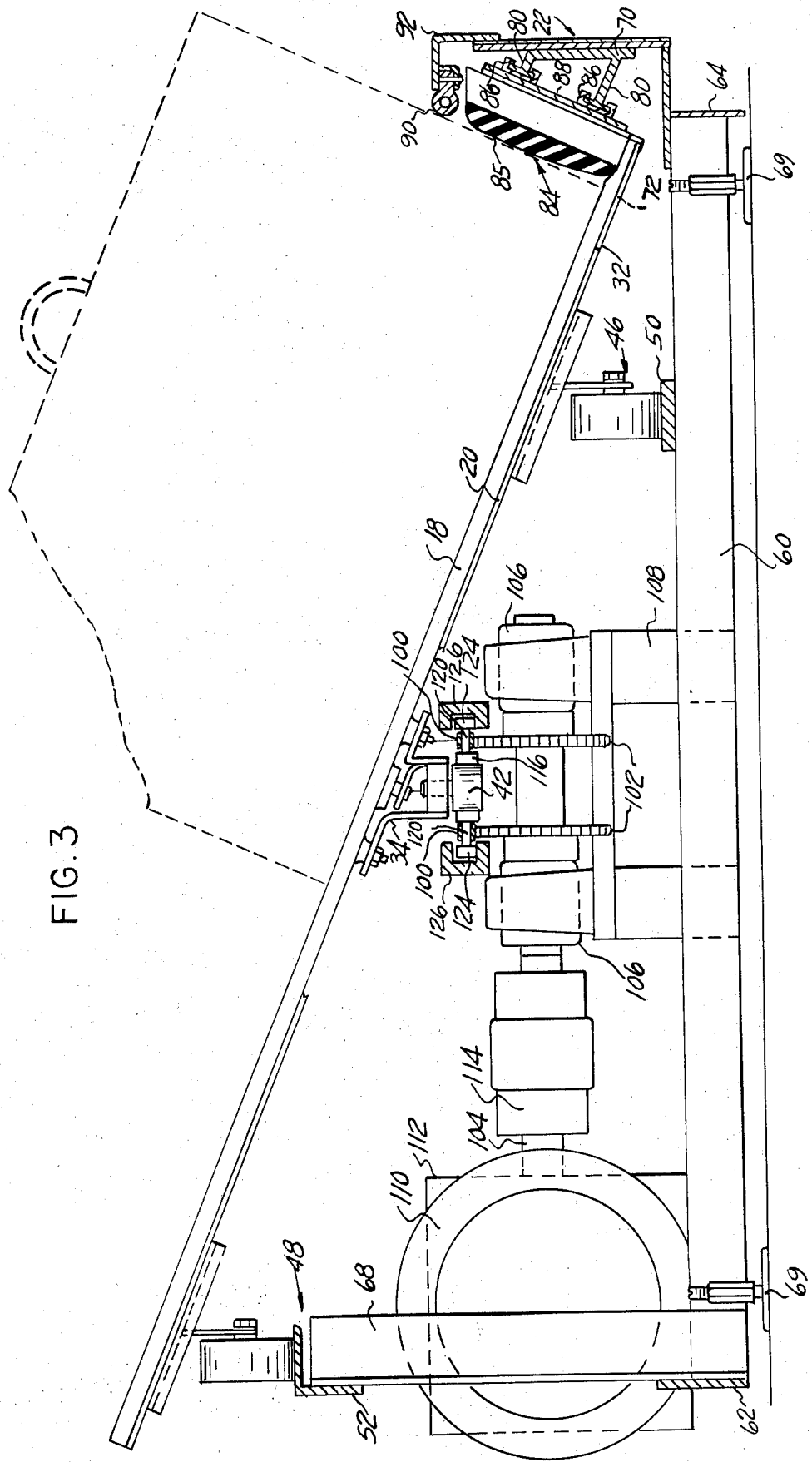
FIG. 3 is a transverse cross-sectional view of the conveyor of FIG. 1 enlarged somewhat for purposes of clarity.
Figure 4:
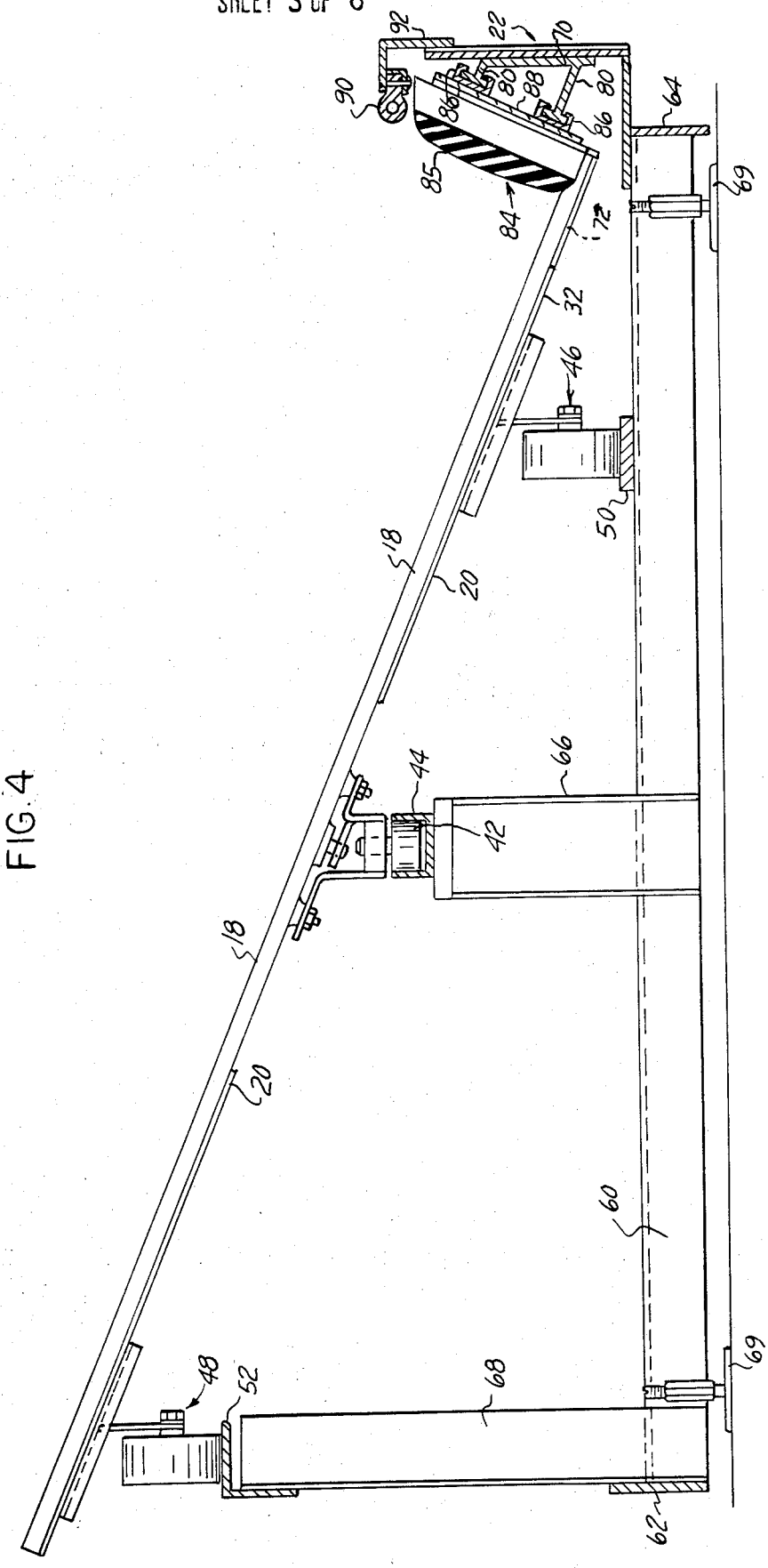
FIG. 4 is a view similar to FIG. 3 but taken at a point to illustrate the drive section of the assembly.

As can best be seen in FIGS. 3 and 4, tracks 44 (FIG. 4), 50 and 52 are provided for the rollers 42 and wheels 46 and 48, respectively, and are supported by a framework consisting of cross struts 60 welded or otherwise joined to inner and outer support members 62 and 64. The support members 62 and 64 form the contour of the conveyor assembly 16 and thus these members will be curved as necessary to produce a closed-loop construction like those illustrated in FIGS. 1 and 2.

The track 50 is supported directly by the cross struts 60 and is welded or otherwise secured in place. Upwardly extending support members 66 (FIG. 4) are welded or otherwise mounted near the middle of the cross struts 60 and extend upwardly therefrom to support the track 44. The track 52 is supported at the top of vertically extending struts 68 mounted to the inside support member 62. Legs 69 support the framework.

As can best be seen in FIGS. 3 and 4, the degree of banking of the pallets 18 and the support members 20 is regulated by the length of the support members 66 and the struts 68. Gradual reduction in the length of these members, until they are eliminated, produces an assembly in which the conveyor assembly moves from the banked position shown to a horizontal position. The hinged construction of the support members 20 in combination with the pivotal connection between the support members 20 and the pallets 18 permits the pallets 18 to move from banked sections to horizontal sections and this, of course, increases the versatility of the present conveyor assembly.

Still referring to FIGS. 3 and 4, the guide rail 22 is mounted to the top of support member 64 and the cross struts 60 and supports on its inner surface a channel member 70. An accordian-like bumper member 84, preferably constructed of rubber or similar material, is secured to the support members 20 by means of a plurality of L-shaped pins 72 which enter through the hinge portion 32 of the support members 20. The bumper member 84 includes substantially vertically extending rubber cushions 85 mounted in a position to engage the luggage 14 which slides down the pallets 18 to the front of the conveyor assembly 16. The bumper member 84 moves with the conveyor and in this way the luggage 14 will be moved along the conveyor assembly 16 by the pallets 18 without interference from the guide rail 22.

The channel member 70 preferably includes T-shaped guide members 80 which receive substantially horizontally extending slide members 86. The slide members 86 are constructed of a reduced friction material such as tetrafluorethylene or the like and engage with substantially vertically extending slide members 88 constructed of similar material and mounted to the underside of the bumper assembly 82.

Figure 10:
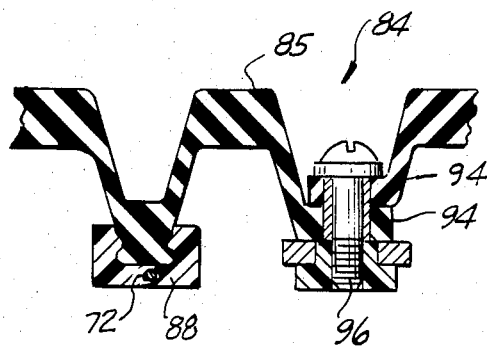
FIG. 10 is a cross-sectional view taken substantially on line 10—10 of FIG. 9.

The construction of the bumper member 84 and the manner in which the slide members 88 are mounted on the underside of the bumper member 84 intermediate the individual rubber cushions 85 is best seen in FIG. 10. The substantially vertically extending portions of the pins 72 extend upwardly into the slide members 88. The pins 72 then mount the bumper assembly 84 to the support members 20 so that the bumper assembly 84 moves along with the conveyor assembly 16. As seen in FIGS. 3 and 4, a resilient tube 90 is mounted to a bracket 92 extending from the top of the guide rail 22 to prevent injuries and damage that could otherwise be caused by objects or fingers becoming wedged between the guide rail 22 and the moving bumper member 84. Other means, of course, can be utilized to mount the bumper member 84 to the support members 20.

Figure 9:
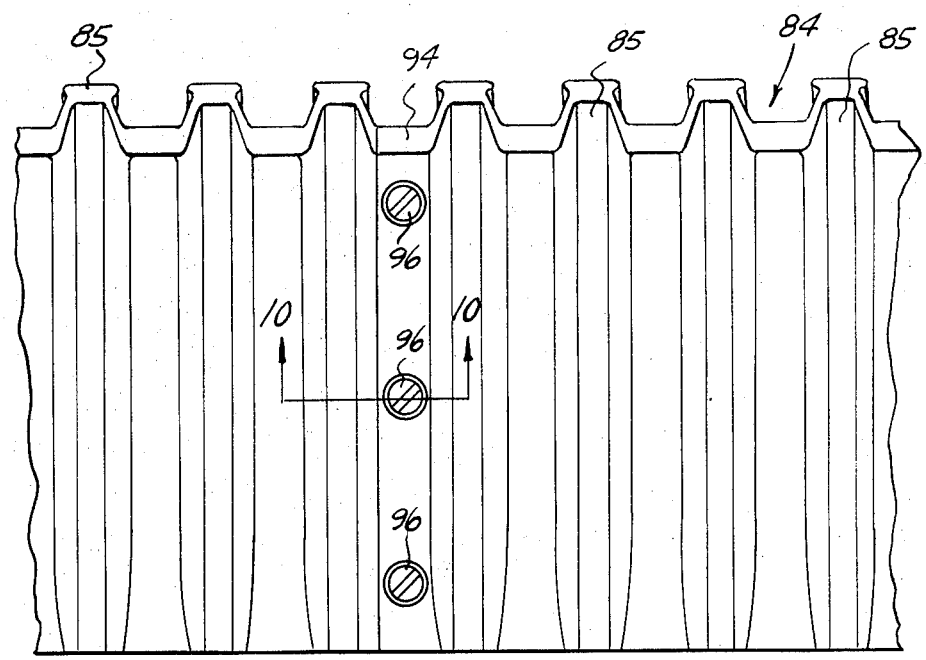
FIG. 9 is an enlarged front elevational view of the bumper member of the present invention.

As can best be seen in FIGS. 9-10, sections of the bumper member 84 are joined together by overlapping end sections 94 which are fastened together by bolts and nuts 96. This construction of the bumper assembly 84 provides a bumper which is resilient and which therefore can contract and expand as the conveyor assembly 16 moves through the inside and outside turns illustrated in FIGS. 1 and 2. If the bumper assembly 84 were constructed of a rigid material, it could not accommodate these turns.

Figure 8:
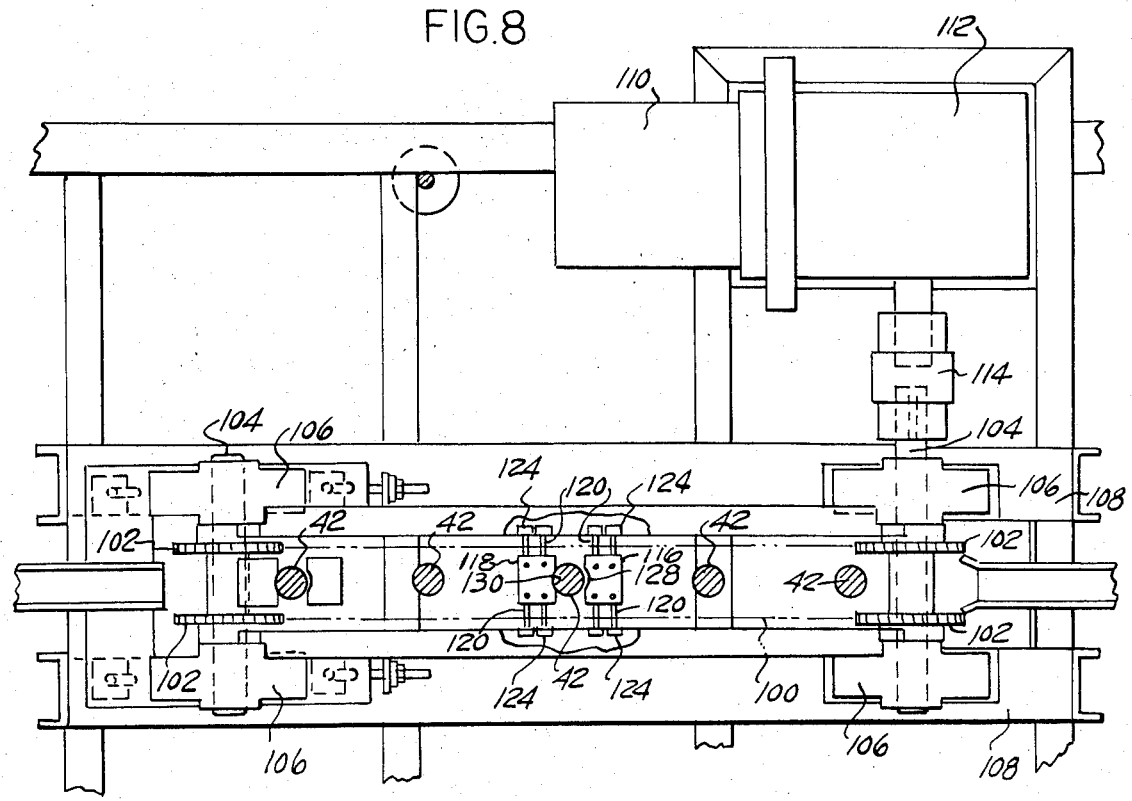
FIG. 8 is a top plan view of a portion of the conveyor assembly of the present invention.

FIGS. 3 and 8 illustrate the drive mechanism for the conveyor assembly of the present invention. The drive mechanism is quite similar to that disclosed in my prior U. S. Pat. No. 3,498,445 issued Mar. 3, 1970. The disclosure of that patent is incorporated by reference herein.

As can best be seen in FIGS. 3 and 8, the pallets 18 and support members 20 are driven along the conveyor path by a pair of endless chains 100, which are disposed parallel to each other and which pass over spaced pairs of sprockets 102. The sprockets 102 are mounted in pairs on common shafts 104 which are supported in spaced bearings 106 carried by support members 108.

One of the shafts 104 is driven by suitable motor means, such as an electric motor 110, connected through suitable gear reduction means 112 and a clutch 114.

Paired driving dogs 116 and 118, which are mirror images of each other, are inserted between the pair of chains 100 at spaced intervals, as best seen in FIG. 8. Each of the pair of driving dogs 116 and 118 are retained by means of cross pins 120. The cross pins 120 are received in the aligned apertures provided for the conventional locking pins of the chains 100. Rollers 124 are provided on the outer extension of the pins 120 to ride in tracks 126, as can best be seen in FIG. 3, to insure that the chains 100 will not sag from the weight of the driving dogs 116 and 118.

The driving dogs 116 and 118 have arcuate cut-out sections 128 and 130 (FIG. 8) respectively, in opposed relation and contoured to allow the rollers 42 to be positioned between adjacent driving dogs 116 and 118 to be drivingly engaged by one of the driving dogs 116 or 118 depending upon the direction of travel of the conveyor assembly. The rollers 124 and tracks 126 insure that the driving dogs 116 and 118 will be in a position to engage the rollers 42.

Thus as viewed in FIG. 8 and assuming travel to the right, the pallets 18 and support members 20 are driven by the driving dogs 118 and their engagement with the rollers 42.

It is apparent that a conveyor assembly has been described which is capable of being formed to follow a path which includes both inside and outside turns, and which can be banked throughout such turns. Or, if desired, the pallets can be gradually taken from a section where they are substantially horizontal to a position in which they are banked. This is made possible by the unique construction of the pallets and support members. The pivotal connection between the pallets and the support members and the hinged construction of the support members provide relative movement of these members in two different planes, and thus provide the movement necessary to permit the conveyor assembly to follow the banked and curved course.

It is apparent that although I have described a single preferred embodiment of the present invention many changes and modifications can be made therein without departing from the spirit of the invention or the scope of the appended claims.

I claim:

1. A conveyor comprising a plurality of pallets and a support member underlying each pair of adjacent pallets, means for moving said pallets and said support members about a closed course, said pallets each being pivotally mounted to a pair of support members and said support members being hinged about an axis disposed between adjacent pallets and extending substantially normal to the axis of the pivotal connection between said support members and said pallets.

2. The conveyor as defined in claim 1 and in which said pallets are hexagon-shaped, with side edges which extend toward each other from a point of maximum width substantially midway between their ends, the pivotal connection between said support members and said pallets being disposed near said point of maximum width.

3. The conveyor as defined in claim 1 and in which said support members are hinged along their longitudinal axis.

4. The conveyor as defined in claim 1 and including a frame, tracks supported by said frame and rollers mounted to said pallets and said support members to engage said tracks.

5. The conveyor as defined in claim 4 and including a guide rail mounted to said frame and a bumper member mounted to said support members and disposed adjacent said pallets to engage articles carried by said pallets.

6. The conveyor as defined in claim 4 and in which said bumper member is elastic in the direction of travel of said conveyor assembly.

7. The conveyor as defined in claim 5 and in which said bumper member comprises a plurality of substantially vertically extending cushions, a substantially horizontally extending slide member carried by said frame and substantially vertically extending slide members carried by said bumper member and slidably engaging said first mentioned slide member.

8. A conveyor comprising a plurality of pallets and a support member underlying each pair of adjacent pallets, means for moving said pallets and said support members about a closed course, said pallets each being hexagon-shaped, with side edges which extend toward each other from a point of maximum width substantially midway between its ends, and a pivotal connection between said pallets and each adjacent pair of support members, said pivotal connection being disposed near said point of maximum width.

9. The conveyor as defined in claim 8 and including a frame, tracks supported by said frame and rollers mounted to said pallets and said support members to engage said tracks.

10. The conveyor as defined in claim 9 and including a bumper member mounted to said support members adjacent one end of said pallets to engage articles carried by said pallets.

* * * * *